(12) United States Patent
Hoshikawa et al.

(10) Patent No.: US 10,113,068 B2
(45) Date of Patent: Oct. 30, 2018

(54) POWDER PRIMER COMPOSITION AND LAMINATE USING IT

(71) Applicant: ASAHI GLASS COMPANY, LIMITED, Chiyoda-ku (JP)

(72) Inventors: Jun Hoshikawa, Chiyoda-ku (JP); Noriharu Tate, Chiyoda-ku (JP); Hitoshi Susa, Chiyoda-ku (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 15/096,550

(22) Filed: Apr. 12, 2016

(65) Prior Publication Data

US 2016/0222219 A1 Aug. 4, 2016

Related U.S. Application Data

(63) Continuation of application No. PCT/JP2014/082312, filed on Dec. 5, 2014.

(30) Foreign Application Priority Data

Dec. 11, 2013 (JP) .................................. 2013-255660

(51) Int. Cl.
| | |
|---|---|
| *C09D 5/00* | (2006.01) |
| *C09D 127/18* | (2006.01) |
| *C09D 5/03* | (2006.01) |
| *C09D 123/08* | (2006.01) |
| *C09D 163/00* | (2006.01) |
| *B32B 27/32* | (2006.01) |
| *B32B 27/38* | (2006.01) |

(52) U.S. Cl.
CPC ............ *C09D 5/002* (2013.01); *B32B 27/322* (2013.01); *B32B 27/38* (2013.01); *C09D 5/00* (2013.01); *C09D 5/03* (2013.01); *C09D 5/031* (2013.01); *C09D 123/08* (2013.01); *C09D 127/18* (2013.01); *C09D 163/00* (2013.01)

(58) Field of Classification Search
None
See application file for complete search history.

(56) References Cited

U.S. PATENT DOCUMENTS

| | | | |
|---|---|---|---|
| 3,111,426 A | 11/1963 | Capron et al. | |
| 6,242,089 B1 * | 6/2001 | Buegman | C08J 5/18 427/180 |
| 2004/0147666 A1 | 7/2004 | Tomihashi et al. | |
| 2007/0255015 A1 | 11/2007 | Kato et al. | |
| 2008/0102283 A1 * | 5/2008 | Momiyama | C09D 5/033 428/413 |
| 2015/0030857 A1 * | 1/2015 | Shigenai | C08J 3/12 428/421 |

FOREIGN PATENT DOCUMENTS

| | | |
|---|---|---|
| CN | 101952375 A | 1/2011 |
| EP | 1 021 488 | 7/2003 |
| JP | 58-141252 | 8/1983 |
| JP | 2006-167689 | 6/2006 |
| JP | 2006-206637 | 8/2006 |
| JP | 2007-314759 | 12/2007 |
| WO | WO 02/090450 A1 | 11/2002 |
| WO | WO 2013/146078 A1 | 10/2013 |

OTHER PUBLICATIONS

International Search Report dated Feb. 10, 2015 in PCT/JP2014/082312 filed on Dec. 5, 2014.

* cited by examiner

*Primary Examiner* — Callie E Shosho
*Assistant Examiner* — Patrick N English
(74) *Attorney, Agent, or Firm* — Oblon, McClelland, Maier & Neustadt, L.L.P.

(57) ABSTRACT

To provide a powder primer composition excellent in adhesion properties and a laminate obtained by using it. The power primer composition comprises a powder made of a reactive ethylene/tetrafluoroethylene copolymer containing repeating units (A) based on tetrafluoroethylene, repeating units (B) based on ethylene, and repeating units (C) based on a monomer having an acid anhydride residue and a polymerizable unsaturated bond, wherein (C)/((A)+(B)) is from 1/10,000 to 5/100 by molar ratio; and a powder made of an epoxy resin having an epoxy equivalent of from 500 to 2,700 and a softening point of at least 70° C.; wherein the mass ratio of the powder made of a reactive ethylene/tetrafluoroethylene copolymer to the powder made of an epoxy resin is from 99/1 to 80/20.

18 Claims, No Drawings

POWDER PRIMER COMPOSITION AND LAMINATE USING IT

TECHNICAL FIELD

The present invention relates to a powder primer composition and a laminate using it.

BACKGROUND ART

An ethylene/tetrafluoroethylene copolymer (hereinafter referred to also as "ETFE") is excellent in heat resistance, chemical resistance, weather resistance, gas barrier properties, etc. and is used in various fields including semiconductor industry, automobile industry, chemical industry, etc. Pelletized ETFE particles may be processed into various molded products by extrusion molding, injection molding, etc. Further, finer ETFE particles may be processed for coating or lining on the surface of a heat-resistant substrate by a powder coating method such as an electrostatic coating method, or a method such as a rotational molding method, and thus utilized for improvement in chemical resistance or protection of a metal surface of e.g. containers, tanks, pipings, joints, etc. Especially, coating by an electrostatic coating method is widely used, since it is thereby possible to easily form a coating film on the surface of an abnormally shaped article.

In general, as compared with a perfluorinated fluororesin such as a polytetrafluoroethylene resin, ETFE has good adhesion properties to a substrate, and therefore, in many cases, it is applied directly on a substrate surface after applying surface roughening treatment such as sand blasting to the substrate surface. However, in recent years, an ETFE-coated article has been required to be used in a severer environment, and it is desired to improve the adhesion properties between ETFE and the substrate.

Under these circumstances, a powder primer composition employing a reactive ETFE having reactive groups in ETFE molecules, is known (e.g. Patent Document 1). Further, a liquid primer composition employing a silane coupling agent in order to improve the adhesion properties between ETFE and a substrate, is known (e.g. Patent Document 2). Still further, an attempt to mix an epoxy resin powder to a fluororesin powder, followed by heat-treatment at from 180 to 200° C., is known (e.g. Patent Document 3).

PRIOR ART DOCUMENTS

Patent Documents

Patent Document 1: JP-A-2006-206637
Patent Document 2: JP-A-2006-167689
Patent Document 3: U.S. Pat. No. 3,111,426

DISCLOSURE OF INVENTION

Technical Problem

However, still higher adhesion properties than the reactive ETFE disclosed in Patent Document 1, are now desired between the ETFE coating film and the substrate. Likewise, still higher adhesion properties than the primer disclosed in Patent Document 2, are now desired between the ETFE coating film and the substrate. Further, in Patent Document 3, it is required to add at least 30% of an epoxy resin in order to obtain sufficient adhesion properties, whereby flowability of the powder tends to decrease, and the thickness of the coating film tends to be uneven. Further, usually the firing temperature for ETFE is high at a level of about 300° C., whereby there are problems such that foaming or swelling is likely to occur due to heat decomposition of the curing agent or the epoxy resin in the firing step.

It is an object of the present invention to solve such problems of the prior art as described above and to provide a powder primer composition excellent in adhesion properties to a substrate and a laminate obtained by using it.

Solution to Problem

The present invention provides a powder primer composition comprising a powder made of a reactive ethylene/tetrafluoroethylene copolymer containing repeating units (A) based on tetrafluoroethylene, repeating units (B) based on ethylene, and repeating units (C) based on a monomer having an acid anhydride residue and a polymerizable unsaturated bond, wherein (C)/((A)+(B)) is from 1/10,000 to 5/100 by molar ratio; and a powder made of an epoxy resin having an epoxy equivalent of from 500 to 2,700 and a softening point of at least 70° C.; wherein the mass ratio of the powder made of a reactive ethylene/tetrafluoroethylene copolymer to the powder made of an epoxy resin is from 99/1 to 80/20.

The present invention provides a laminate having a primer layer being a heat-treated product of the powder primer composition as defined above and a top coating layer made of a fluororesin, laminated in this order on the surface of a substrate.

Advantageous Effects of Invention

By the present invention, it is possible to provide a powder primer composition excellent in adhesion properties to a substrate and a laminate obtained by using it.

DESCRIPTION OF EMBODIMENTS

In this specification, the term "step" is meant to include not only an independent step but also a step which cannot be definitely distinguished from another step, so long as the desired object of that step is thereby accomplished. Further, a numerical range represented by using "to" represents a range including the numerical values given before and after "to" as the minimum value and the maximum value, respectively. Further, the content of each component in a composition means, when a plurality of materials corresponding to each component are present in the composition, the total amount of the plurality of materials present in the composition, unless otherwise specified.

Powder Primer Composition

A primer layer to be formed from the powder primer composition of the present invention (hereinafter also referred to simply as "the primer composition") is excellent in adhesion properties to a substrate, and especially is excellent in adhesion properties to a substrate and in adhesion properties to a top coating layer made of a fluororesin to be formed on the primer layer. Further, the primer composition is excellent in storage stability. Furthermore, it is excellent in coating properties, and it is thereby possible to readily obtain a coating layer with high uniformity.

The average particle size of the primer composition is not particularly limited, and may be from 1 to 1,000 μm, preferably from 1 to 300 μm, more preferably from 3 to 300

μm, particularly preferably from 5 to 200 μm. When the average particle size is at least 1 μm, the deposition amount at the time of coating increases, whereby the adhesion force and durability will be stabilized, and when it is at most 1,000 μm, dropout of particles after coating tends to be less, and the surface smoothness tends to be good. The average particle size of the primer composition is meant for the average particle size of the entire powder contained in the composition. The average particle size of the primer composition is a median size on volumetric basis as measured by means of a laser diffraction scattering particle size distribution measuring apparatus.

The bulk density of the primer composition is not particularly limited, but is preferably from 0.4 to 1.2 g/cc, more preferably from 0.5 to 1.0 g/cc. When the bulk density is at least 0.4 g/cc, the deposition amount at the time of coating increases, whereby the adhesion force and durability will be stabilized, and it is possible to prevent defects in the coating film due to air bubbles to be formed during the firing. And, when it is at most 1.2 g/cc, dropout of particles at the time of coating tends to be less, and the surface smoothness tends to be good. The bulk density can be measured by the method disclosed in JIS K6891.

The angle of repose of the primer composition is not particularly limited, but is preferably from 20 to 52 degrees, more preferably from 30 to 50 degrees. When the angle of repose is at least 20 degrees, the production is not difficult, and when it is at most 52 degrees, the powder flowability tends to be improved, and it tends to be possible to prevent such a problem as clogging of a coating gun or formation of bridges in the powder supply tank during the electrostatic coating. The angle of repose can easily be obtained by reading the angle of repose of a powder dropped on a repose angle measuring device by a protractor, and it is possible to use e.g. a repose angle measuring device manufactured by AS ONE Corporation, or Powder Tester PTX model manufactured by Hosokawa Micron Ltd.

Powder Made of Reactive Ethylene/Tetrafluoroethylene Copolymer

The powder made of a reactive ethylene/tetrafluoroethylene copolymer (hereinafter referred to also as "reactive ETFE powder") contains repeating units (A) based on tetrafluoroethylene (hereinafter referred to also as "TFE") (hereinafter referred to also as "repeating units (A)"), repeating units (B) based on ethylene (hereinafter referred to also as "repeating units (B)"), and repeating units (C) based on a monomer having an acid anhydride residue and a polymerizable unsaturated bond (hereinafter referred to also as "repeating units (C)").

In the present invention, the reactive ETFE powder will react with an epoxy resin in a firing step at a temperature of from 200 to 320° C., but its reaction at room temperature is extremely suppressed, whereby it can be stably stored for a long period of time.

As the reactive ETFE powder, one type may be used alone, or two or more types may be used in combination.

Repeating Units (C) Based on a Monomer Having an Acid Anhydride Residue and a Polymerizable Unsaturated Bond The reactive ETFE powder contains at least one type of repeating units (C). The repeating units (C) are formed by polymerization of a monomer having an acid anhydride residue and a polymerizable unsaturated bond by itself or with tetrafluoroethylene or ethylene. The repeating units (C) may have an acid anhydride group derived from the monomer, as it is, or may have an acidic functional group formed by hydrolysis of the acid anhydride group. The repeating units (C) may be one type alone, or a combination of two or more types.

The monomer having an acid anhydride residue and a polymerizable unsaturated bond, to constitute the repeating units (C), is not particularly limited, and may, for example, be maleic anhydride, itaconic anhydride (hereinafter referred to as "IAH"), citraconic anhydride (hereinafter referred to as "CAH"), or 5-norbornene-2,3-dicarboxylic anhydride. Preferred is IAH or CAH. When IAH or CAH is used, reactive ETFE tends to be easily obtainable.

As the monomer having an acid anhydride residue and a polymerizable unsaturated bond, one type may be used alone, or two or more types may be used in combination.

In the present invention, the content ratio of (C)/((A)+(B)) is from 1/10,000 to 5/100 by molar ratio. If (C)/((A)+(B)) is less than 1/10,000, the chemical reaction with the powder made of an epoxy resin tends to be too little in the firing step to produce a primer layer, whereby it tends to be difficult to obtain a high adhesion force to a substrate. On the other hand, if (C)/((A)+(B)) exceeds 5/100, the chemical resistance or the heat resistance tends to be low. (C)/((A)+(B)) is preferably from 1/1,000 to 5/100, more preferably from 3/2,000 to 3/100, particularly preferably from 3/1,000 to 3/100. Within such a range, the adhesion properties tend to be further excellent, and the chemical resistance or heat resistance tends to be further excellent.

In the present invention, the content ratio of (A) to (B) is not particularly limited, but (A)/(B) is preferably from 20/80 to 80/20, more preferably from 50/50 to 70/30, by molar ratio. When (A)/(B) is at least 20/80, the heat resistance, weather resistance, chemical resistance and gas barrier property tend to be further improved, and when (A)/(B) is at most 80/20, the mechanical strength and melting properties tend to be further improved.

In the present invention, the contents of repeating units (A), (B) and (C) correspond substantially to the charged amounts of monomers to constitute the respective repeating units.

Repeating Units (D) Based on Other Monomers

The reactive ETFE in the present invention may contain, in addition to repeating units (A), (B) and (C), repeating units (D) based on other monomers other than monomers to constitute repeating units (A), (B) and (C) (hereinafter referred to also as "repeating units (D)"). Repeating units (D) may be one type alone, or a combination of two or more types.

Other monomers to constitute the repeating units (D) may, for example, be a hydrocarbon-type olefin having at least three carbon atoms, such as propylene or butene; a compound represented by $CH_2=CX(CF_2)_nY$ (wherein X and Y are each independently a hydrogen atom or a fluorine atom, and n is an integer of from 2 to 8); a fluoro-olefin having hydrogen atoms in an unsaturated group, such as vinylidene fluoride, vinyl fluoride or trifluoroethylene; a fluoro-olefin having no hydrogen atom in an unsaturated group (excluding TFE), such as hexafluoropropylene or chlorotrifluoroethylene; a perfluoro(alkyl vinyl ether) such as perfluoro (propyl vinyl ether); a vinyl ether, such as an alkyl vinyl ether, a (fluoroalkyl) vinyl ether, glycidyl vinyl ether, hydroxybutyl vinyl ether or methyl vinyloxybutyl carbonate; an vinyl ester such as vinyl acetate, vinyl chloroacetate, vinyl butanoate, vinyl pivalate, vinyl benzoate or vinyl crotonate; a (meth)acrylate such as a (polyfluoroalkyl) acrylate or a (polyfluoroalkyl) methacrylate; etc.

As such other monomers, one type may be used alone, or two or more types may be used in combination.

As such other monomers, at least one member selected from the group consisting of hexafluoropropylene, perfluoro (propyl vinyl ether) and a compound represented by the above $CH_2=CX(CF_2)_nY$, is preferred. Among them, a compound represented by the above $CH_2=CX(CF_2)_nY$ is more preferred, and one wherein n=2 to 4, is particularly preferred. Specific examples of the compound represented by $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_3H$, $CH_2=CH(CF_2)_4H$, etc. $CH_2=CF(CF_2)_2F$, $CH_2=CH(CF_2)_2F$, $CH_2=CH(CF_2)_2H$ or $CH_2=CF(CF_2)_2H$ is preferred, and $CH_2=CH(CF_2)_2F$ is more preferred.

The content of repeating units (D) is preferably from 0 to 20 mol %, more preferably from 0 to 15 mol %, particularly preferably from 0 to 10 mol %, to all repeating units in the reactive ethylene/tetrafluoroethylene copolymer. In the present invention, the content of repeating units (D) corresponds substantially to the charged amount of other monomers.

Average Particle Size

The average particle size of the reactive ETFE powder is not particularly limited, and may be from 1 to 1,000 µm, preferably from 1 to 300 µm, more preferably from 3 to 300 µm, particularly preferably from 5 to 200 µm. When the average particle size is at least 1 µm, the deposition amount of the reactive ETFE powder at the time of coating increases, whereby the number of repeated coating times may be made less, and when it is at most 1,000 µm, dropout of the reactive ETFE powder after the coating tends to be less, and the surface smoothness tends to be excellent. The average particle size of the reactive ETFE powder is a median size on volumetric basis as measured by means of a laser diffraction scattering particle size distribution apparatus.

Preparation Method

The method for producing the reactive ETFE powder is not particularly limited, but a method may be mentioned wherein reactive ETFE is produced, followed by pulverization treatment. The method for producing reactive ETFE is not particularly limited, but a method disclosed in JP-A-2004-238405 may, for example, be mentioned. Here, in a case where a dispersion of reactive ETFE is produced, the ETFE dispersion may be directly sprayed to vaporize and remove the medium to obtain reactive ETFE powder. The pulverization treatment may, for example, be a method wherein reactive ETFE powder contained in the ETFE dispersion is granulated to an intermediate particle size, followed by drying, and then, pulverized by a pulverizer such as a hammer mill, a turbo mill, a cutting mill, a crusher, a jet mill or a counter jet mill, or a method of mechanically pulverizing reactive ETFE at a low temperature of less than room temperature where reactive ETFE is embrittled (hereinafter referred to also as "freeze-crushing"). By freeze-crushing, reactive ETFE powder with a small particle size can easily be obtained.

In the case of freeze-crushing, pulverization is carried out while cooling with a cooling medium such as liquefied carbon dioxide gas or liquid nitrogen. As the freeze-crushing apparatus, a freeze-crushing machine manufactured by AS ONE Corporation, or Linrex Mill manufactured by Hosokawa Micron Corporation may, for example, be used. The temperature at the time of pulverization is preferably from −200 to 20° C., more preferably from −180 to −20° C., particularly preferably from −150 to −50° C.

Here, the particle size of the reactive ETFE powder may be adjusted by classifying by means of sieves or an air stream Powder Made of Epoxy Resin The powder made of an epoxy resin is solid at normal temperature (e.g. 25° C.). The epoxy resin is meant for a resin having at least one epoxy group in one molecule. The epoxy resin is not particularly limited, and may, for example, be a bisphenol A-type epoxy resin obtainable by a condensation reaction of bisphenol A with epichlorohydrin, a bisphenol F-type epoxy resin, a bisphenol AD-type epoxy resin, a phenol novolac-type epoxy resin, a cresol novolac-type epoxy resin, a glycidyl ester-type epoxy resin, a biphenyl-type epoxy resin, a polymer-type epoxy resin, other modified epoxy resins, etc.

As the powder made of an epoxy resin, one type may be used alone, or two or more types may be used in combination.

The powder made of an epoxy resin has a softening point of at least 70° C. If the softening point of the powder made of an epoxy resin is lower than 70° C., the storage stability of the primer composition tends to be low, and foaming or change in color tends to be likely to occur. The softening point of the epoxy resin is preferably from 80 to 140° C., more preferably from 90 to 130° C. When the softening point of the powder made of an epoxy resin is at most 140° C., melting tends to be easy at the time of heat treatment, and the adhesion force tends to be improved. Here, the softening point of the epoxy resin can be measured by the method disclosed in JIS K7234 (ring-and-ball method).

The molecular weight of the epoxy resin is not particularly limited, but is preferably from 1,000 to 3,500, more preferably from 1,500 to 3,000. When the molecular weight of the epoxy resin is at least 1,000, a cross-linking reaction tends to be less likely to take place during the storage, the storage stability tends to be improved, and foaming or change in color tends to be suppressed, and when it is at most 3,500, melting tends to be easy at the time of heat treatment, and the adhesion force tends to be improved.

The epoxy equivalent of the powder made of an epoxy resin is from 500 to 2,700, preferably from 700 to 2,300, more preferably from 900 to 2,000. If the epoxy equivalent is less than 500, the storage stability tends to be low, and foaming or change in color tends to be likely to occur, and if it exceeds 2,700, melting tends to be difficult at the time of heat treatment, and the adhesion force tends to be low. The epoxy equivalent is the number of grams of a resin containing one gram equivalent of epoxy groups, and can be measured by the method disclosed in JIS K7236 (potentiometric titration).

As such an epoxy resin, as a solid epoxy resin as a commercial product, epoxy resin jER (registered trademark) 1004, 1004K, 1004F, 1004AF or 1007 manufactured by Mitsubishi Chemical Corporation, or epoxy resin Epiclon (registered trademark) 4050 or 7050 manufactured by DIC Corporation, may, for example, be mentioned.

Average Particle Size

The average particle size of the powder made of an epoxy resin is not particularly limited, and may be from 1 to 1,000

µm, preferably from 1 to 300 µm, more preferably from 3 to 200 µm, particularly preferably from 5 to 50 µm. When the average particle size of the powder made of an epoxy resin is at least 1 µm, the storage stability tends to be improved, and the powder flowability tends to be improved, and when it is at most 1,000 µm, the reactivity with the reactive ETFE powder at the time of heat treatment tends to be improved, and the adhesion force tends to be improved. The average particle size of the powder made of an epoxy resin is a median size on volumetric basis as measured by means of a laser diffraction scattering particle size distribution apparatus.

Preparation Method

The method for producing the powder made of an epoxy resin is not particularly limited, and a method of pulverizing the above-mentioned commercially available solid epoxy resin may be mentioned. The pulverization method may, for example, be a method of pulverizing by means of a pulverizer such as a hammer mill, a turbo mill, a cutting mill, a crusher, a jet mill or a counter jet mill, or a method of freeze-crushing it at a low temperature. Here, in a case where the average particle size of the above-mentioned commercially available solid epoxy resin is within the above-mentioned preferred range of the particle size of the powder made of an epoxy resin, such a resin may be used as it is.

Further, the particle size of the powder made of an epoxy resin may be adjusted by classifying by means of sieves or an air stream.

In the primer composition, the mass ratio of the reactive ETFE powder to the powder made of an epoxy resin is from 99/1 to 80/20, preferably from 98/2 to 85/15, particularly preferably from 97/3 to 88/12. If the mass ratio of the reactive ETFE powder to the powder made of an epoxy resin exceeds 99/1, the adhesion force tends to be low, and if the mass ratio of the reactive ETFE powder to the powder made of an epoxy resin is less than 80/20, the flowability of the primer composition tends to be low, whereby coating tends to be non-uniform, and foaming or color change tends to be likely to occur due to heat decomposition of the epoxy resin.

Further Components

The primer composition may contain further components within a range to obtain the effects of the present invention. The primer composition may contain, as a coloring agent, a pigment such as carbon black, graphite, cobalt blue, ultramarine or titanium oxide; silica, alumina, etc. to improve the flowability; an inorganic filler as a reinforcing material; other synthetic resin powders; etc. The content of these components may be at most 5.0 parts by mass, preferably from 0.1 to 5.0 parts by mass, particularly preferably from 0.1 to 3.0 parts by mass.

Further, the primer composition may contain a thermal stabilizer such as a copper compound, a tin compound, an iron compound, a lead compound, a titanium compound or an aluminum compound, within a range not to impair the adhesion effects of the primer composition. The content of the thermal stabilizer may be less than 1.0 part by mass, preferably less than 0.1 part by mass, per 100 parts by mass in total of the reactive ETFE powder and the powder made of an epoxy resin, more preferably not substantially contained.

Preparation Method

The primer composition can be produced by mixing the respective components. The mixing method may, for example, be a dry blending method by means of e.g. a V type blender, a double cone type blender, a container blender, a drum type blender, a horizontal cylinder type mixer, a ribbon mixer, a paddle mixer or a screw mixer. Here, the mixing is preferably conducted at a temperature of less than the softening point of the powder made of an epoxy resin. For example, if mixed for a long time in a mixing device with a strong shear force or centrifugal force such as a Henschel mixer, the epoxy resin will be softened and fixed to the reactive ETFE powder to form nodules, whereby the powder flowability tends to be lowered. Further, during the mixing, a chemical reaction is likely to take place between the reactive ETFE powder and the powder made of an epoxy resin, such being undesirable.

Laminate

In the present invention, the laminate is one having a primer layer being a heat-treated product of the primer composition and a top coating layer made of a fluoro-resin, laminated in this order on the surface of a substrate. The laminate may further be such that on the surface of the top coating layer, a coating layer of an organic or inorganic material being a material different from the top coating layer, may be laminated.

The laminate is excellent in heat resistance, durability such as alkali resistance and adhesion properties.

Substrate

The substrate in the present invention is not particularly limited and may, for example, be a metal such as iron, stainless steel, aluminum, copper, tin, titanium, chromium, nickel or zinc, glass, or heat-resistant material such as ceramic. Among them, iron, stainless steel or aluminum is preferred.

The shape of the substrate in the present invention is not particularly limited and may, for example, be a pipe, a tube, a film, a plate, a tank, a roll, a vessel, a bulb or an elbow, and it may be used for, for example, various containers, pipes, tubes, tanks, pipe lines, joints, rolls, autoclaves, heat exchangers, distillation towers, jigs, bulbs, stirring vanes, tanker lorries, pumps, casings for blowers, centrifugal separators, kitchen utensils, etc.

Primer Layer

The primer layer in the present invention is a heat-treated product of the primer composition. The primer composition is as described above including its preferred embodiments. The thickness of the primer layer is preferably from 1 to 1,000 µm, more preferably from 5 to 500 µm, most preferably from 10 to 200 µm. When the thickness of the primer layer is at least 1 µm, the adhesion properties will be sufficiently exhibited, and when it is at most 1,000 µm, foaming or swelling tends to be less likely to occur.

Top Coating Layer

The top coating layer made of a fluoro-resin can be formed by applying a powder made of a fluoro-resin or a powdery top coating composition containing a powder made of a fluoro-resin, followed by curing.

Powder Made of Fluoro-Resin or Powdery Top Coating Composition Containing Powder Made of Fluoro-Resin The powder made of a fluoro-resin is a powder of a fluoro-resin which is solid at normal temperature (e.g. 25°

C.). The fluoro-resin is not particularly limited, and may, for example, be a homopolymer or copolymer of a fluorinated monomer, provided that the above-described reactive ETFE is excluded. The fluorinated monomer may, for example, be the above-mentioned, TFE, fluoro-olefin having hydrogen atoms in an unsaturated bond, fluoro-olefin having no hydrogen atom in an unsaturated bond (excluding TFE) or perfluoroalkyl vinyl ether. Further, the fluoro-resin may be a copolymer wherein the above-mentioned, ethylene, hydrocarbon-type olefin having at least 3 carbon atoms, monomer having an acid anhydride residue and a polymerizable unsaturated bond, vinyl ether, vinyl ester, or a monomer having no fluorine atom, such as a (meth)acrylate, is used as a co-monomer component.

As such a fluoro-resin, a non-reactive ethylene/tetrafluoroethylene copolymer (hereinafter referred to also as "non-reactive ETFE"), a propylene/TFE copolymer, a TFE/perfluoro(alkyl vinyl ether) copolymer, a TFE/hexafluoropropylene copolymer, a TFE/hexafluoropropylene/vinylidene fluoride copolymer, a chlorotrifluoroethylene/ethylene copolymer, a vinylidene fluoride copolymer or a hexafluoropropylene/vinylidene fluoride copolymer may, for example, be mentioned, and a non-reactive ETFE is preferred. That is, in the present invention, the top coating layer made of a fluoro-resin is preferably one obtainable by using a powder made of a non-reactive ETFE (hereinafter referred to also as "non-reactive ETFE powder") or a powdery top coating composition containing a powder made of a non-reactive ETFE.

The non-reactive ETFE powder means an ETFE powder wherein (C)/((A)+(B)) in the above definition of the reactive ETFE powder is less than 1/10,000 by molar ratio. Further, the non-reactive ETFE powder may contain repeating units (D) based on other monomers. Except that (C)/((A)+(B)) is less than 1/10,000 by molar ratio, the non-reactive ETFE powder is as described above with respect to the reactive ETFE powder including its preferred embodiments. As specific examples of the non-reactive ETFE powder, Fluon (registered trademark) TL-081, Z-8820X and LM-2150 (each has no repeating units (C) based on a monomer having an acid anhydride residue and a polymerizable unsaturated bond), manufactured by Asahi Glass Co., Ltd., may be mentioned.

As the powder made of a fluoro-resin, one type may be used alone, or two or more types may be used in combination.

The average particle size of the powder made of a fluoro-resin is preferably from 1 to 1,000 µm, more preferably from 5 to 300 µm, particularly preferably from 10 to 200 µm. When the average particle size of the powder made of a fluoro-resin is at least 1 µm, the deposition amount is less likely to be too small, and the number of coating times to attain a prescribed thickness may be reduced, and when it is at most 1,000 µm, smoothness of the surface tends to be maintained. The average particle size of the powder made of a fluoro-resin is a median size on volumetric basis as measured by means of a laser diffraction scattering particle size distribution apparatus.

Further, the powdery top coating composition containing the powder made of a fluoro-resin preferably contains a thermal stabilizer such as a copper compound, a tin compound, an iron compound, a lead compound, a titanium compound or an aluminum compound. When it contains a thermal stabilizer, yellowing or sagging due to thermal degradation in the firing step tends to be less likely to occur. The content of the thermal stabilizer is preferably from $1\times10^{-8}$ to 5 mass %, more preferably from $1\times10^{-7}$ to 1 mass %, particularly preferably from $5\times10^{-7}$ to 0.1 mass %, in the top coating composition. Further, the specific surface area of the thermal stabilizer is preferably from 0.1 to 100 m$^2$/g, more preferably from 1 to 70 m$^2$/g, particularly preferably from 5 to 50 m$^2$/g. The specific surface area is one measured by a BET method.

Thickness of Top Coating Layer

As the thickness of the top coating layer, an optimum thickness may be selected within a range of from 10 to 5,000 µm. For the purpose of e.g. improving water repellency, improving an antifouling property or improving glossiness, of the substrate surface, a thickness of from 10 to 100 µm is preferred; for the purpose of improving lubricity of the substrate surface or protection of the surface, a thickness of from 50 to 500 µm is preferred; for the purpose of protection of the substrate against an organic reagent or an inorganic reagent, a thickness of from 200 to 1,000 µm is preferred; and particularly in a case where durability for a very long period of time is required, a thickness of from 1,000 to 5,000 µm is preferred. If too thin, the covering effects tend to be insufficient, and if too thick, the number of coating times is required to be increased, such being not only economically disadvantageous, but also stress-strain is likely to occur due to a difference in the thermal expansion coefficient from the substrate, such being undesirable.

Coating Layer of Organic or Inorganic Material as a Material Different From Top Coating Layer A coating layer of an organic or inorganic material as a material different from the top coating layer (hereinafter referred to also as a "further coating layer") may, for example, be a coloring layer, a hard coating layer or a penetration-preventing layer. When the laminate further contains such a coating layer, it will have a further effect such as a coloring effect, a hard coating effect or a penetration-preventing effect. The thickness of the further coating layer is not particularly limited, and may be from 0 to 1,000 µm, preferably from 0 to 500 µm. The thickness of the further coating layer may be adjusted depending upon the characteristics to be imparted by the further coating layer.

Peel Strength

In the laminate of the present invention, the adhesion force of the top coating layer to the substrate can be ascertained by measuring the 90° peel strength. The higher the adhesion force, the better. However, it is preferably a peel strength of at least 20 N/cm, more preferably a peel strength of at least 40 N/cm, particularly preferably a peel strength of at least 50 N/cm. If the peel strength is less than 20 N/cm, the adhesion reliability is low, and depending upon the application environment, peeling or blistering of the coating film or corrosion deterioration of the substrate is likely to be brought about, such being undesirable.

Process for Producing Laminate

In the present invention, the laminate is obtainable by a production process comprising a step of forming a primer layer on a substrate surface, and a step of forming a top coating layer on the surface of the primer layer, and, as the case requires, containing a step of forming a further coating layer on the surface of the top coating layer.

Process for Producing Primer Layer

The primer layer is obtainable by a production process comprising a step of applying the primer composition of the present invention to the surface of a substrate to form a primer composition layer, and a step of heat-treating the primer composition layer to form a primer layer. By the heat treatment, the reactive ETFE powder and the powder made of an epoxy resin are chemically reacted and cured to form a primer layer.

The method for applying the primer composition is not particularly limited, and a known powder coating method, such as an electrostatic coating method, a fluidized dipping method or a rotational molding method, may be mentioned. Among them, an electrostatic coating method is preferred, since it is simple, and a large area can thereby be coated with a uniform thickness. As the coating machine, various commercially available electrostatic coating devices may be used, and by applying static electricity at a voltage of from −100 to −30 kV, the primer composition may be sprayed together with an air stream.

The thickness of the primer composition layer to be applied on the substrate is such a thickness that it would become the thickness of the above-mentioned primer layer, including preferred ones. Here, when the thickness of the primer composition is within the above range, sufficient adhesion properties will be developed by applying the primer composition once, however, the primer composition may be applied plural times. Further, the thickness of the primer composition may be adjusted depending upon the thickness of the primer layer after the heat treatment.

The amount of the primer composition to be applied on the substrate is not particularly limited, so long as it is an amount to obtain the above mentioned thickness of the primer composition, and it is preferably from 1.6 to 1,600 $g/m^2$, more preferably from 8.0 to 800 $g/m^2$.

The heat treatment of the primer composition layer can be carried out by an optional heating means, such as an electric furnace, gas furnace or infrared heating furnace, set at a predetermined temperature.

The heat treatment temperature is preferably from 260 to 340° C., more preferably from 280 to 320° C., particularly preferably from 290 to 310° C. When the heat treatment temperature is at least 260° C., lowering of the adhesion force or remaining of voids or air bubbles due to firing deficiency, tends to be less likely to occur, and when it is at most 340° C., change in color or formation of foams tends to be suppressed.

The heat treatment time may vary depending upon the heat treatment temperature, but heat treatment within a range of from 1 to 180 minutes is preferred, and more preferred is from 5 to 120 minutes, and particularly preferred is from 10 to 60 minutes. When the heat treatment time is at least 1 minute, lowering of the adhesion force or remaining of air bubbles due to firing deficiency tends to be less likely to occur, and when it is at most 180 minutes, change in color or formation of foams tends to be suppressed.

Prior to application of the primer composition, the substrate may be preheated at a temperature of at most 200° C. Further, prior to application of the primer composition, the substrate surface may be surface-roughened by e.g. sand blast treatment, etching treatment or metal spray treatment, or cleaning with a solvent may be carried out to remove foreign matters deposited on the surface. Thereby, the adhesion properties tend to be improved. Here, in the case of sand blast treatment, the surface roughness Ra can be adjusted within a range of from 1 to 100 μm depending upon the adhesion properties or use.

Process for Producing Top Coating Layer

The top coating layer is obtainable by a production process comprising a step of applying a powder made of a fluoro-resin, or a top coating composition containing a powder made of a fluoro-resin, on the surface of the primer layer laminated on a substrate surface, to form a powder layer made of a fluoro-resin or a top coating composition layer containing the powder made of a fluoro-resin, and a step of heat-treating the powder layer made of a fluoro-resin or the top coating composition layer containing the powder made of a fluoro-resin, to form a top coating layer.

The method for applying the powder made of a fluoro-resin or the top coating composition containing the powder made of a fluoro-resin, is not particularly limited, and a method of applying the primer coating composition may be mentioned, and a known powder coating method such as an electrostatic coating method, a fluidized dipping method or a rotational molding method, may be applied, but an electrostatic coating method is preferred, since the application can thereby be made simply in a uniform thickness.

The thickness of the powder layer made of a fluoro-resin or the top coating composition layer containing the powder made of a fluoro-resin, to be formed on the surface to the primer layer, is such a thickness that it would become the thickness of the above-mentioned top coating layer, including preferred ones. Here, when the thickness of the powder layer made of a fluoro-resin or the top coating composition layer containing the powder made of a fluoro-resin is within the above range, it is sufficient to apply the powder made of a fluoro-resin or the top coating composition containing the powder made of a fluoro-resin once, however, the powder made of a fluoro-resin or the top coating composition containing the powder made of a fluoro-resin may be applied plural times. Further, the thickness of the powder layer made of a fluoro-resin or the top coating composition layer containing the powder made of a fluoro-resin may be adjusted depending upon the thickness after the firing. In a case where the top coating layer is formed plural times, such a plurality of top coating layers may be collectively referred to as the top coating layer.

The amount of the powder made of a fluoro-resin or the top coating composition containing the powder made of a fluoro-resin, to be applied on the surface of the primer layer, is not particularly limited, so long as it is an amount to become the above-mentioned thickness of the top coating layer.

The heat treatment of the powder layer made of a fluoro-resin or the top coating composition layer containing the powder made of a fluoro-resin, is not particularly limited, so long as it is under such a condition that the top coating layer is formed on the surface of the primer layer, and it may be conducted by an optional means, such as an electric furnace, a gas furnace or an infrared heating furnace, set at a predetermined temperature. The heat treatment temperature is preferably from 260 to 340° C., more preferably from 280 to 320° C., particularly preferably from 290 to 310° C. When the heat treatment temperature is at least 260° C., remaining of voids or air bubbles due to firing deficiency tends to be less likely to occur, and when it is at most 340° C., change in color or foaming tends to be less likely to occur.

The heat treatment time may vary depending upon the heat treatment temperature, but heat treatment within a range of from 1 to 180 minutes is preferred, and more preferred is from 5 to 120 minutes, and particularly preferred is from 10 to 60 minutes. When the heat treatment time is at least 1 minute, remaining of air bubbles due to firing deficiency tends to be less likely to occur, and when it is at most 180 minutes, change in color or sagging tends to be less likely to occur.

Process for Producing Coating Layer of Organic or Inorganic Material as a Material Different From Top Coating Layer The further coating layer is obtainable by a production process comprising a step of applying a composition for a coating layer of an organic or inorganic material as a material different from the top coating, on the surface of the top coating layer, and a step of forming the further coating layer. The thickness of the coating layer of an organic or inorganic material as a material different from the top coating, is not particularly limited, and may be the thickness of the above-mentioned further coating layer. The composition for the further coating layer and the conditions for the process for producing the further coating layer, are not particularly limited, and conditions which are commonly used for forming a further coating layer, may be mentioned.

EXAMPLES

Now, the present invention will be described in detail with reference to Examples, but the present invention is by no means limited thereto. Ex. 1 to 5 are Examples of the present invention, and Ex. 6 to 11 are Comparative Examples. The coating and evaluations in each Ex. were conducted by the following methods.

Coating Thickness

Five points were measured by an electromagnetic film thickness meter, and an average value was obtained.

Judgement of Appearance

A case where no abnormality is observed during the application of the powder coating composition or on the coating film appearance of a primer layer-attached substrate or a coating test specimen was rated as rank A, and a case where sagging or thickness irregularities are observed, or abnormality such as air bubbles or swelling, or irregularities in coating film thickness, are confirmed, ranking was made by the following standards, and rank D was taken as unacceptable.
  Very uniform appearance: rank A
  Generally uniform appearance: rank B
  Slight abnormality observed: rank C
  Substantial abnormality observed: rank D Evaluation of Initial Adhesion Properties On the surface of a coating test specimen or a primer layer-attached substrate, by using a cutter knife, cuts were made at 10 mm intervals, whereupon a part of the top coating layer was peeled and then fixed to a chuck of a tensile tester, and the 90° peel strength was measured at a tensile speed of 50 mm/min. With respect to the obtained initial peel strength, ranking was made by the following standards, and rank D was taken as unacceptable.

Peel strength≥50.0 N/cm: rank A
At least 40.0 and less than 50.0 N/cm: rank B
At least 20.0 and less than 40.0 N/cm: rank C
<20.0 N/cm: rank D Hydrothermal Resistance A coating test specimen was treated at 130° C. for 24 hours by a pressure cooker (high temperature vapor pressure vessel), whereupon in the same manner as the evaluation of the initial adhesion properties, the peel strength of the top coating layer was measured. With respect to the obtained peel strength after the hydrothermal resistance test, ranking was made in the same manner as the evaluation of the initial peel strength.

Alkali Resistance

A coating test specimen was immersed in a 10 mass % sodium hydroxide aqueous solution at 80° C. for 300 hours, whereupon in the same manner as the evaluation of the initial adhesion properties, the peel strength of the top coating layer was measured. With respect to the obtained peel strength after the alkali resistance test, ranking was made in the same manner as the evaluation of the initial peel strength.

Average Particle Size

Each powder was dispersed in a 0.1 mass % surfactant (Newcol 1308FA(90), manufactured by Nippon Nyukazai Co., Ltd.) aqueous solution, and the median average particle size on volumetric basis was measured by means of a laser scattering particle size distribution meter (LA-920, manufactured by Horiba, Ltd).

Bulk Density

Measured by the method disclosed in JIS K6891.

Angle of Repose

The angle of repose was measured by a repose angle meter (a turn table type repose angle meter, manufactured by Tsutsui Scientific Instruments Co., Ltd.). The smaller the angle of repose, the better the powder flowability.

Storage Stability

A powder primer composition was stored at 40° C. for 300 hours, whereupon ranking was made based on formation of nodules and powder flowability.
  No formation of nodules is observed, and the flowability is good: rank A
  No formation of nodules is observed, but the flowability is slightly low: rank B
  Nodules are formed, but easily disintegratable to be useful: rank C
  Nodules are formed to be hardly useful: rank D Ex. 1

Production of Reactive ETFE Powder (Reactive ETFE-1)

ETFE comprising repeating units (A) based on TFE/ repeating units (B) based on ethylene/repeating units (C)

based on IAH/repeating units (D) based on $CH_2=CH(CF_2)_4F$ in a molar ratio of 57.6/40.0/1.8/0.6 (i.e. (C)/((A)+(B)) being 1.84/100 by molar ratio) and having a melting point of 242° C., was solution-polymerized and subjected to granulation treatment, and the particles thereby obtained, were pulverized by a freeze crusher TPH-01 manufactured by AS ONE Corporation, to obtain reactive ETFE powder having an average particle size of 40 μm (reactive ETFE-1).

Production of Powder (EP-1) Made of Epoxy Resin

Powder (EP-1) made of an epoxy resin and having an average particle size of 23 μm, was obtained by pulverizing Epoxy Resin 1004 manufactured by Mitsubishi Chemical Corporation (epoxy equivalent 925, molecular weight 1650, softening point 97° C.) by Freeze Crusher TPH-01, manufactured by AS ONE Corporation.

Production of ETFE Powder Primer Composition (P-1)

The reactive ETFE powder (reactive ETFE-1) and powder (EP-1) made of an epoxy resin were mixed in a mass ratio of 95/5 for one minute by a V type blender to prepare ETFE powder primer composition (P-1). The temperature after the mixing was 25° C., the powder flowability of the ETFE powder primer composition after the mixing was good, and the average particle size was 39 μm.

Further, with this ETFE powder primer composition, no abnormality was observed after the storage stability test at 40° C. for 300 hours.

Production of Laminate

The surface of a SUS 316 stainless steel plate having a length of 50 mm, a breadth of 150 mm and a thickness of 2 mm was subjected to sand blast treatment to bring the surface roughness Ra=5 to 10 μm by means of alumina particles of 60 mesh, and then, the surface was cleaned with ethanol to prepare a substrate for testing.

On the surface of this substrate for testing, the ETFE powder primer composition (P-1) was sprayed by means of an electrostatic coating gun for powder by an applied voltage of –60 kV, followed by firing at 300° C. for 10 minutes as hanged in an oven, to form a primer layer thereby to obtain a primer layer-attached substrate.

Then, on its surface, as a non-reactive ETFE powder for top coating, Fluon ETFE-TL-081 manufactured by Asahi Glass Co., Ltd. (non-reactive ETFE-1, not containing repeating units (C) based on a monomer having an acid anhydride residue and a polymerizable unsaturated bond), was applied by electrostatic coating and fired at 300° C. for 10 minutes, and this electrostatic coating and firing step was repeated three times, to form a top coating layer having a total thickness of 370 μm, thereby to obtain a coating test specimen. The initial peel strength of the top coating layer was 71.9 N/cm, and also after the hydrothermal resistance test and the alkali resistance test, it showed a sufficient peel strength.

Ex 2 and 3

ETFE powder primer composition (P-2) and ETFE powder primer composition (P-3) were prepared by changing the blend amounts of the reactive ETFE powder (reactive ETFE-1) and the powder (EP-1) made of an epoxy resin, as shown in Table 1, and coating test specimens were obtained. The same evaluation as in Ex. 1 was conducted, whereby good results were obtained.

Ex. 4

Powder primer composition (P-4) was prepared with a blend composition shown as Ex. 4 in Table 1, by using, as a powder made of an epoxy resin, powder (EP-2) made of an epoxy resin with an average particle size of 28 μm, obtained by freeze-crushing epoxy resin 1007 manufactured by Mitsubishi Chemical Corporation (epoxy equivalent: 1,975, molecular weight: 2,900, softening point: 128° C.). Further, by using, as a non-reactive ETFE powder for top coating, Fluon ETFE-Z-8820X manufactured by Asahi Glass Co., Ltd (non-reactive ETFE-2, not containing repeating units (C) based on a monomer having an acid anhydride residue and a polymerizable unsaturated bond), a coating test specimen was obtained. The same evaluation as in Ex. 1 was conducted, whereby good results were obtained.

Ex. 5

Reactive ETFE powder having an average particle size of 10 μm (reactive ETFE-2) was obtained by changing the pulverization conditions for ETFE powder prepared in Ex. 1, and powder primer composition (P-5) was prepared with a blend composition shown as Ex. 5 in Table 1. After conducting primer coating by using the powder primer composition (P-5), top coating was conducted 6 times, to obtain a coating test specimen. The same evaluation as in Ex. 1 was conducted, whereby good results were obtained.

Ex. 6 (Comparative Example)

Powder primer composition (P-6) was prepared with a blend composition shown as Ex. 6 in Table 2, and a coating test specimen was obtained. The same evaluation as in Ex. 1 was conducted, whereby the peel strength was no good, which is considered to be attributable to that no epoxy resin was used.

Ex. 7 (Comparative Example)

Powder primer composition (P-7) was prepared with a blend composition shown as Ex. 7 in Table 2, and a coating test specimen was obtained. The same evaluation as in Ex. 1 was conducted, whereby the peel strength was no good, which is considered to be attributable to that no reactive ETFE was used.

Ex. 8 (Comparative Example)

Powder primer composition (P-8) was prepared with a blend composition shown as Ex. 8 in Table 2, by using, as a powder made of an epoxy resin, powder (EP-3) made of an epoxy resin with an average particle size of 67 μm, obtained by freeze-crushing epoxy resin 1001 manufactured by Mitsubishi Chemical Corporation (epoxy equivalent: 475, molecular weight: 900, softening point: 64° C.), and a coating test specimen was obtained. The same evaluation as in Ex. 1 was conducted, whereby the peel strength after the hydrothermal resistance test and the alkali resistance test, was no good, and deterioration of the powder flowability due to formation of nodules was observed after the storage stability test.

Ex. 9 (Comparative Example)

Powder primer composition (P-9) was prepared with a blend composition shown as Ex. 9 in Table 2, by using, as a powder made of an epoxy resin, powder (EP-4) made of an epoxy resin with an average particle size of 56 μm, obtained by freeze-crushing epoxy resin 1009 manufactured by Mitsubishi Chemical Corporation (epoxy equivalent: 2,850, molecular weight: 3,800, softening point: 144° C.), and a coating test specimen was obtained. The same evaluation as in Ex. 1 was conducted, whereby the peel strength was low.

Ex. 10 (Comparative Example)

Powder primer composition (P-10) was prepared by increasing the blend amount of powder EP-1 made of an epoxy resin with a blend composition shown by Ex. 10 in Table 2, and a coating test specimen was obtained. The same evaluation as in Ex. 1 was conducted, whereby since the powder flowability was low, coating irregularities were observed at the time of coating the primer layer. Further, deterioration of the powder flowability due to formation of nodules was observed after the storage stability test.

Ex. 11 (Comparative Example)

With a blend composition shown as Ex. 8 in Table 2, mixing of the reactive EFTE powder and the powder made of an epoxy resin, was carried out for 10 minutes by means of a Henschel mixer. The temperature of the powder during mixing rose to 70° C., whereby formation of nodules in the mixture was so much that primer coating was impossible.

TABLE 1

|  | Materials, items | Unit | Ex. 1 | Ex. 2 | Ex. 3 | Ex. 4 | Ex. 5 |
|---|---|---|---|---|---|---|---|
| No. of primer |  |  | P-1 | P-2 | P-3 | P-4 | P-5 |
| Blend ratios in primer composition | Reactive ETFE-1 | Parts by mass | 95 | 90 | 85 | 90 |  |
|  | Reactive ETFE-2 | Parts by mass |  |  |  |  | 95 |
|  | EP-1 | Parts by mass | 5 | 10 | 15 |  | 5 |
|  | EP-2 | Parts by mass |  |  |  | 10 |  |
|  | EP-3 | Parts by mass |  |  |  |  |  |
|  | EP-4 | Parts by mass |  |  |  |  |  |
|  | Total | Parts by mass | 100 | 100 | 100 | 100 | 100 |
| Blend composition of primer | Bulk density | g/cc | 0.66 | 0.64 | 0.61 | 0.65 | 0.58 |
|  | Angle of repose | ° | 45 | 47 | 49 | 47 | 48 |
|  | Average particle size | μm | 39 | 38 | 37 | 39 | 11 |
|  | Rank of storage stability |  | A | A | A | A | A |
| Primer coating | Application times | Times | 1 | 1 | 1 | 1 | 1 |
|  | Coating thickness | μm | 34 | 36 | 38 | 42 | 22 |
|  | Rank of appearance |  | A | A | A | A | A |
| Top coating | Type of ETFE |  | Non-reactive ETFE-1 | Non-reactive ETFE-1 | Non-reactive ETFE-1 | Non-reactive ETFE-2 | Non-reactive ETFE-1 |
|  | Application times | Times | 3 | 3 | 3 | 3 | 6 |
|  | Coating thickness | μm | 370 | 380 | 360 | 390 | 610 |
|  | Rank of appearance |  | A | A | A | A | A |
| Peel strength | Initial | N/cm | 71.9 | 77.5 | 81.0 | 62.2 | 68.6 |
|  | Rank |  | A | A | A | A | A |
|  | Hydrothermal resistance | N/cm | 55.2 | 52.1 | 47.2 | 50.4 | 62.2 |
|  | Rank |  | A | A | A | A | A |
|  | Alkali resistance | N/cm | 59.1 | 55.6 | 61.1 | 56.8 | 64.0 |
|  | Rank |  | A | A | A | A | A |

TABLE 2

|  |  | Unit | Ex. 6 | Ex. 7 | Ex. 8 | Ex. 9 | Ex. 10 |
|---|---|---|---|---|---|---|---|
| Primer composition No. | No. |  | P-6 | P-7 | P-8 | P-9 | P-10 |
| Blend ratios in primer composition | Reactive ETFE-1 | Parts by mass | 100 |  | 90 | 95 | 70 |
|  | Non-reactive ETFE-1 | Parts by mass |  | 95 |  |  |  |
|  | EP-1 | Parts by mass |  | 5 |  |  | 30 |
|  | EP-2 | Parts by mass |  |  |  |  |  |
|  | EP-3 | Parts by mass |  |  | 10 |  |  |
|  | EP-4 | Parts by mass |  |  |  | 5 |  |
|  | Total | Parts by mass | 100 | 100 | 100 | 100 | 100 |
| Properties of primer | Bulk density | g/cc | 0.69 | 0.68 | 0.65 | 0.68 | 0.40 |
|  | Angle of repose | ° | 42 | 47 | 55 | 44 | 61 |
|  | Average particle size | μm | 40 | 73 | 43 | 41 | 35 |
|  | Rank of storage stability |  | A | A | C nodules are formed | A | C nodules are formed |
| Primer coating | Application times | Times | 1 | 1 | 1 | 1 | 1 |
|  | Coating thickness | μm | 42 | 52 | 43 | 45 | 51 |
|  | Rank of appearance |  | A | A | C slight thickness irregularities occurred | A | D substantial thickness irregularities occurred |

TABLE 2-continued

|  |  | Unit | Ex. 6 | Ex. 7 | Ex. 8 | Ex. 9 | Ex. 10 |
|---|---|---|---|---|---|---|---|
| Top coating | Type of ETFE |  | Non-reactive ETFE-1 | Non-reactive ETFE-1 | Non-reactive ETFE-1 | Non-reactive ETFE-1 | Non-reactive ETFE-1 |
|  | Application times | Times | 3 | 3 | 3 | 3 | 3 |
|  | Coating thickness | μm | 370 | 380 | 390 | 380 | 450 |
|  | Rank of appearance |  | A | A | C slight air bubbles observed in the primer layer | A | D substantial air bubbles observed in the primer layer |
| Peel strength | Initial | N/cm | 25.8 | 32.0 | 55.2 | 34.2 | 36.2 |
|  | Rank |  | C | C | A | C | C |
|  | Hydrothermal resistance | N/cm | 8.1 | 25.5 | 23.5 | 15.6 | 28.6 |
|  | Rank |  | D | C | C | D | C |
|  | Alkali resistance | N/cm | 4.6 | 16.1 | 35.1 | 8.3 | 13.5 |
|  | Rank |  | D | D | C | D | D |

Reactive ETFE-1: average particle size 40 μm

Reactive ETFE-2: average particle size 10 μm

Non-reactive ETFE-1: TL-081, manufactured by Asahi Glass Co., Ltd., average particle size 76 μm Non-reactive ETFE-2: Z-8820X, manufactured by Asahi Glass Co., Ltd., average particle size 45 μm EP-1: Epoxy resin 1004 pulverized product, manufactured by Mitsubishi Chemical Corporation, average particle size 23 μm, epoxy equivalent 925, softening point 97° C., molecular weight 1,650

EP-2: Epoxy resin 1007 pulverized product, manufactured by Mitsubishi Chemical Corporation, average particle size 28 μm, epoxy equivalent 1,975, softening point 128° C., molecular weight 2,900

EP-3: Epoxy resin1001 pulverized product, manufactured by Mitsubishi Chemical Corporation, average particle size 67 μm, epoxy equivalent 475, softening point 64° C., molecular weight 900

EP-4: Epoxy resin 1009 pulverized product, manufactured by Mitsubishi Chemical Corporation, average particle size 56 μm, epoxy equivalent 2,850, softening point 144° C., molecular weight 3,800

INDUSTRIAL APPLICABILITY

The primer composition of the present invention is excellent in adhesion properties, durability, storage stability and uniform coating properties, as compared with conventional ETFE primers. The primer composition of the present invention can be applied to the surface of a heat resistant substrate such as metal, glass, ceramics, etc. and is useful as a primer for lining, coating or surface treatment by a fluoro-resin, particularly by ETFE. The primer composition of the present invention and a laminate obtainable by using the primer composition of the present invention, may be used for, for example, various containers, pipes, tubes, tanks, pipe lines, joints, rolls, autoclaves, heat exchangers, distillation towers, jigs, bulbs, stirring vanes, tanker lorries, pumps, casings for blowers, centrifugal separators, kitchen utensils, etc.

This application is a continuation of PCT Application No. PCT/JP2014/082312, filed on Dec. 5, 2014, which is based upon and claims the benefit of priority from Japanese Patent Application No. 2013-255660 filed on Dec. 11, 2013. The contents of those applications are incorporated herein by reference in their entireties.

What is claimed is:

1. A powder primer composition comprising:
a powder made of a reactive ethylene/tetrafluoroethylene copolymer containing repeating units (A) based on tetrafluoroethylene, repeating units (B) based on ethylene, and repeating units (C) based on a monomer having an acid anhydride residue and a polymerizable unsaturated bond, wherein a ratio (C)/((A)+(B)) is from 1/10,000 to 5/100 by molar ratio; and
a powder made of an epoxy resin having an epoxy equivalent of from 500 to 2,700 and a softening point of at least 70° C.;
wherein a mass ratio of the powder made of a reactive ethylene/tetrafluoroethylene copolymer to the powder made of an epoxy resin is from 99/1 to 80/20,
wherein an average particle size of the powder made of a reactive ethylene/tetrafluoroethylene copolymer is from 1 to 1,000 μm, an average particle size of the powder made of the an epoxy resin is from 1 to 1,000 μm, and a ratio of the average particle size of the powder made of the epoxy resin to the average particle size of the reactive ethylene/tetrafluoroethylene copolymer is from 0.575 to 2.30,
wherein the powder primer composition is prepared by dry blending component powders, and
wherein no formation of nodules is observed in the powder primer composition.

2. The powder primer composition of claim 1, wherein an average particle size of the powder primer composition is from 1 to 1,000 μm.

3. The powder primer composition of claim 1, wherein an average particle size of the powder primer composition is from 1 to 300 μm.

4. A laminate comprising a primer layer which is a heat-treated product of the powder primer composition of claim 1 and a top coating layer made of a fluororesin, laminated in this order on a surface of a substrate.

5. The laminate of claim 4, wherein the peel strength of the top coating layer to the substrate is at least 20 N/cm.

6. The powder primer composition of claim 1, wherein a bulk density of the primer composition is from 0.4 to 1.2 g/cc.

7. The powder primer composition of claim 1, wherein an angle of repose of the primer composition is from 20 to 52 degrees.

8. The powder primer composition of claim 1, wherein the monomer having an acid anhydride residue and a polymerizable unsaturated bond is at least one selected from the group consisting of maleic anhydride, itaconic anhydride, citraconic anhydride, and 5-norbornene-2,3-dicarboxylic anhydride.

9. The powder primer composition of claim 1, wherein the ration (C)/((A)+(B)) is from 3/1,000 to 3/100.

10. The powder primer composition of claim 1, wherein a ratio of (A) to (B), (A)/(B), is from 20/80 to 80/20 by mass.

11. The powder primer composition of claim 1, wherein the reactive ethylene/tetrafluoroethylene copolymer comprises repeating units (D) that are different from the repeating units (A), (B), and (C).

12. The powder primer composition of claim 1, wherein the softening point of the epoxy resin is from 80 to 140° C.

13. The powder primer composition of claim 1, wherein the softening point of the epoxy resin is from 90 to 130° C.

14. The powder primer composition of claim 1, wherein a molecular weight of the epoxy resin is from 1,000 to 3,500.

15. The powder primer composition of claim 1, wherein the epoxy equivalent of the powder is from 700 to 2,300.

16. The powder primer composition of claim 1, wherein the epoxy equivalent of the powder is from 900 to 2,000.

17. The powder primer composition of claim 1, wherein the mass ratio of the powder made of the reactive ethylene/tetrafluoroethylene copolymer to the powder made of the epoxy resin is from 98/2 to 85/15.

18. The powder primer composition of claim 1, wherein the mass ratio of the powder made of the reactive ethylene/tetrafluoroethylene copolymer to the powder made of the epoxy resin is from 97/3 to 88/1.

* * * * *